(12) United States Patent
Hong

(10) Patent No.: US 7,846,053 B2
(45) Date of Patent: *Dec. 7, 2010

(54) HYDRAULIC CONTROL SYSTEM OF EIGHT-SPEED AUTOMATIC TRANSMISSION FOR A VEHICLE

(75) Inventor: Jae Hee Hong, Gunpo (KR)

(73) Assignee: Hyundai Motor Company, Seoul (KR)

( * ) Notice: Subject to any disclaimer, the term of this patent is extended or adjusted under 35 U.S.C. 154(b) by 417 days.

This patent is subject to a terminal disclaimer.

(21) Appl. No.: 11/957,701

(22) Filed: Dec. 17, 2007

(65) Prior Publication Data

US 2009/0107796 A1 Apr. 30, 2009

(30) Foreign Application Priority Data

Oct. 29, 2007 (KR) ...................... 10-2007-0108709

(51) Int. Cl.
*F16H 31/00* (2006.01)
(52) U.S. Cl. ..................................... 475/119
(58) Field of Classification Search ................ 477/906; 475/119, 120
See application file for complete search history.

(56) References Cited

U.S. PATENT DOCUMENTS

| 6,027,427 | A * | 2/2000 | Yoo ........................... 477/130 |
| 6,394,926 | B1 * | 5/2002 | Jang .......................... 475/116 |
| 6,537,180 | B2 * | 3/2003 | Kim et al. .................. 477/130 |
| 2008/0318723 | A1 * | 12/2008 | Kang et al. ................. 475/119 |
| 2009/0111646 | A1 * | 4/2009 | Hong .......................... 477/71 |

FOREIGN PATENT DOCUMENTS

KR 10-2009-0043072 A 5/2009

* cited by examiner

*Primary Examiner*—David D Le
*Assistant Examiner*—Justin Holmes
(74) *Attorney, Agent, or Firm*—Morgan, Lewis & Bockius LLP

(57) ABSTRACT

A hydraulic control system of an eight-speed automatic transmission for a vehicle. Four clutches and two brakes can by independently controlled by six proportional control solenoid valves by employing pressure control valves and pressure switching valves.

24 Claims, 8 Drawing Sheets

HYDRAULIC CONTROL SYSTEM OF EIGHT-SPEED AUTOMATIC TRANSMISSION FOR A VEHICLE

CROSS-REFERENCE TO RELATED APPLICATION

This application claims priority to, and the benefit of Korean Patent Application No. 10-2007-0108709, filed in the Korean Intellectual Property Office on Oct. 29, 2007, the entire contents of which are incorporated herein by reference.

BACKGROUND OF THE INVENTION (a) Field of the Invention

The present invention relates to a hydraulic control system of an eight-speed automatic transmission for a vehicle.

(b) Description of the Related Art

A typical automatic transmission includes a torque converter and a powertrain of a multiple speed gear mechanism connected to the torque converter. In addition, a hydraulic control system is provided for selectively operating at least one operational element included in the powertrain according to a running state of a vehicle.

The powertrain includes a compound planetary gear set, including at least two simple planetary gear sets to achieve the required multiple speeds, and a plurality of friction members. The hydraulic control system selectively operates the friction members of the powertrain according to driving conditions.

Recently developed automatic transmissions achieve eight forward speeds for performance and fuel efficiency, and therefore a hydraulic control system for such an eight-speed automatic transmission, that provides precise control and good durability of the transmission, is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a hydraulic control system of an eight-speed automatic transmission for a vehicle having advantages of precise control and optimized fuel efficiency An exemplary embodiment of the present invention provides a hydraulic control system of an eight-speed automatic transmission for a vehicle for controlling a first clutch operated at first, second, third, and fourth forward speeds and an L range; a second clutch operated at fourth, fifth, sixth, seventh, and eighth forward speeds; a third clutch operated at third and filth forward speeds and a reverse speed; a fourth clutch operated at the sixth forward speed; a first brake operated at second and seventh forward speeds; and a second brake operated at the eighth forward speed and the L range. The hydraulic control system includes: a first clutch control portion that supplies a D range pressure to the first clutch C1, the supply of the D range pressure being controlled by a first pressure control valve and a first pressure switching valve by a control of a first proportional control solenoid valve; a second clutch control portion that supplies the D range pressure to the second clutch via a first fail-safe valve, the supply of the D range pressure being controlled by a second pressure control valve and a second pressure switching valve by a control of a second proportional control solenoid valve; a third clutch control portion that supplies a line pressure to the third clutch, the supply of the line pressure to the third clutch being controlled by a third pressure control valve and a third pressure switching valve by a control of a third proportional control solenoid valve and the supply of the line pressure to the third pressure control valve being controlled by a fourth pressure switching valve by a control of a fourth proportional control solenoid valve; a first brake control portion that supplies the D range pressure to the first brake, the supply of the D range pressure to the first brake being controlled by the fourth pressure control valve and a fourth pressure switching valve by a control of the fourth proportional control solenoid valve and the supply of the D range pressure to the fourth pressure control valve being controlled by the third pressure switching valve by a control of the third proportional control solenoid valve; a second brake control portion that supplies the line pressure or an R range pressure to the second brake via a second fail-safe valve, the supply of the line pressure to the second brake being controlled by a fifth pressure control valve and a fifth pressure switching valve by a fifth proportional control solenoid valve, the supply of the line pressure to the fifth pressure control valve being controlled by a sixth pressure switching valve by a control of a sixth proportional control solenoid valve, and the R range pressure being supplied from a switching valve to the second brake; and a fourth clutch control portion that supplies the D range pressure to the fourth clutch via a third fail-safe valve, the supply of the D range pressure to the fourth clutch being controlled by a sixth pressure control valve and the sixth pressure switching valve by a control of the sixth proportional control solenoid valve and the supply of the P range pressure to the sixth pressure control valve being controlled by the fifth pressure switching valve by a control of the fifth proportional control solenoid valve.

The first second, third, fourth, fifth, and sixth proportional control solenoid valves may respectively and independently supply a reduced pressure of a first reducing valve to the first, second, third, fourth, fifth, and sixth pressure control valves and the first, second, third, fourth, fifth, and sixth pressure switching valves as control pressures. The first, second, third, fourth, fifth, and sixth pressure switching valves may commonly receive a control pressure from a second reducing valve.

The line pressure, an operating pressure of the first clutch, an operating pressure of the third clutch or the first brake, and an operating pressure of the second brake or the fourth clutch may be supplied as control pressures to the first fail-safe valve through four routes.

An N/P range pressure and the operating pressure of the third clutch and the first brake may be supplied as control pressures to the second fail-safe valve through three routes.

The line pressure and the operating pressure of the third clutch and the first brake may be supplied as control pressures to the third fail-safe valve.

A first shuttle valve may be arranged between the third clutch and the first brake such that a selective one of the operating pressures of the third clutch and the first brake may be supplied to the first, second, and third fail-safe valves.

A second shuttle valve may be arranged between the second brake and the fourth clutch such that a selective one of the operating pressures of the second brake and the fourth clutch may be supplied to the first fail-safe valve.

The switching valve of the second brake control portion may be controlled by the R range pressure supplied from the manual valve, and supplies the R range pressure to the second brake via the second fail-safe valve.

The first pressure control valve may be integrally formed with the first proportional control solenoid valve and includes a valve body and a valve spool, wherein the valve body of the first pressure control valve includes a first port that receives a control pressure from the first proportional control solenoid valve, a second port that receives the D range pressure, a third port that supplies the hydraulic pressure of the second port to the first clutch, a fourth port that exhausts the hydraulic pressure supplied to the first clutch, and a fifth port that receives the partial pressure of the operating pressure supplied to the first clutch through the first pressure switching valve.

The first pressure switching valve may include a valve body and a valve spool, wherein the valve body of the first pressure switching valve may include a first port that receives the reduced pressure of the second reducing valve, a second port that receives the control pressure from the first proportional control solenoid valve at an opposite side of the first port, a third port that receives the partial pressure of the operating pressure supplied to the first clutch through the first pressure control valve, a fourth port that is connected with the fifth port of the first pressure control valve, and a fifth port that selectively communicates with the fourth port.

The second pressure control valve may be integrally formed with the second proportional control solenoid valve and may include a valve body and a valve spool, wherein the valve body of the second pressure control valve may include a first port that receives a control pressure from the second proportional control solenoid valve, a second port that receives the D range pressure, a third port that supplies the hydraulic pressure of the second port to the second pressure switching valve and the first fail-safe valve, a fourth port that exhausts the hydraulic pressure supplied to the third port, and a fifth port that receives a partial pressure of the hydraulic pressure supplied to the second pressure switching valve.

The second pressure switching valve may include a valve body and a valve spool wherein the valve body may include a first port that receives the reduced pressure of the second reducing valve, a second port that receives the control pressure from the second proportional control solenoid valve at an opposite side of the first port, a third port that receives a partial pressure of the hydraulic pressure supplied to the first fail-safe valve, a fourth port that connects the third port with the fifth port of the second pressure control valve, and a fifth port that exhausts the hydraulic pressure supplied to the fourth port.

The first fail-safe valve may include a valve body and a valve spool, wherein the valve body of the first fail-safe valve may include a first port that receives a partial pressure of the operating pressure of the first clutch as a control pressure, a second port that selectively receives the operating pressure of the fourth clutch and the second brake, a third port that selectively receives the operating pressure of the third clutch and the first brake, a fourth port that receives the hydraulic pressure from the second pressure control valve, a fifth port that supplies the hydraulic pressure supplied through the fourth port to the second clutch, a sixth port that receives the line pressure as a control pressure, and a seventh port that exhausts the hydraulic pressure supplied to the fifth port.

The third pressure control valve may be integrally formed with the third proportional control solenoid valve and may include a valve body and a valve spool, wherein the valve body of the third pressure control valve may include a first port that receives a control pressure from the third proportional control solenoid valve, a second port that receives the hydraulic pressure from the fourth pressure switching valve, a third port that supplies the hydraulic pressure of the second port to the third clutch, a fourth port that exhausts the hydraulic pressure supplied to the third port, and a fifth port that receives a control pressure from the third pressure switching valve.

The third pressure switching valve may include a valve body and a valve spool, wherein the valve body of the third pressure switching valve may include a first port that receives the reduced pressure of the second reducing valve, a second port that receives the control pressure from the third proportional control solenoid valve at an opposite side of the first port, a third port that receives the partial pressure of the hydraulic pressure supplied to the third clutch through the third pressure control valve, a fourth port that connects the third port with the fifth port of the third pressure control valve, a fifth port that selectively communicates with the fourth port so as to exhaust the hydraulic pressure of the fourth port, a sixth port that receives the D range pressure, a seventh port that selectively supplies the hydraulic pressure of the sixth port to the fourth pressure control valve, and an eighth port that selectively exhausts the hydraulic pressure of the seventh port.

The fourth pressure control valve may be integrally formed with the fourth proportional control solenoid valve and may include a valve body and a valve spool, wherein the valve body of the fourth pressure control valve may include a first port that receives a control pressure from the fourth proportional control solenoid valve, a second port that receives the hydraulic pressure from the third pressure switching valve, a third port that supplies the hydraulic pressure of the second port to the first brake, a fourth port that exhausts the hydraulic pressure supplied to the third port, and a fifth port that receives a control pressure from the fourth pressure switching valve.

The fourth pressure switching valve may include a valve body and a valve spool, wherein the valve body of the fourth pressure switching valve may include a first port that receives the reduced pressure of the second reducing valve, a second port that receives the control pressure from the fourth proportional control solenoid valve at an opposite side of the first port, a third port that receives the partial pressure of the hydraulic pressure supplied to the first brake through the fourth pressure control valve, a fourth port that connects the third port with the fifth port of the fourth pressure control valve, a fifth port that receives the line pressure, a sixth port that supplies the hydraulic pressure received through the fifth port to the third pressure control valve, a seventh port that selectively exhausts the hydraulic pressure of the fourth port, and an eighth port that selectively exhausts the hydraulic pressure of the sixth port.

The fifth pressure control valve may be integrally formed with the fifth proportional control solenoid valve and may include a valve body and a valve spool, wherein the valve body of the fifth pressure control valve may include a first port that receives a control pressure from the fifth proportional control solenoid valve, a second port that receives the line pressure from the sixth pressure switching valve, a third port that supplies the hydraulic pressure of the second port to the second fail-safe valve, a fourth port that exhausts the hydraulic pressure supplied to the third port, and a fifth port that receives a partial pressure of the operating pressure supplied to the fifth pressure switching valve.

The fifth pressure switching valve may include a valve body and a valve spool, wherein the valve body of the fifth pressure switching valve may include a first port that receives the reduced pressure of the second reducing valve, a second port that receives the control pressure from the fifth proportional control solenoid valve at an opposite side of the first port, a third port that receives the partial pressure of the hydraulic pressure supplied to the second fail-safe valve through the fifth pressure control valve, a fourth port that selectively communicates with the third port and is connected with the fifth port of the fifth pressure control valve, a fifth port that receives the D range pressure, a sixth port that supplies the D range pressure supplied to the fifth port to the sixth pressure control valve, and seventh and eighth ports that are exhaust ports.

The second fail-safe valve may include a valve body and a valve spool, wherein the valve body of the first pressure switching valve may include first and second ports that are formed at ends of the valve body and receive the N/D range pressure as control pressures, a third port that receives the hydraulic pressure from the fifth pressure control valve, a fourth port that receives the reverse range pressure from the switching valve, a fifth port that selectively supplies the hydraulic pressure of the third and fourth ports to the second brake, and a sixth port that receives the operating pressure of the third clutch or the first brake as a control pressure.

The switching valve may include a valve body and a valve spool, wherein the valve body of the switching valve may include first and second ports that receive the R range pressure as control pressures, a third port that receives the hydraulic pressure from the fourth pressure control valve, and a fourth port that supplies the hydraulic pressure of the third port to the second fail-safe valve.

The sixth pressure control valve may be integrally formed with the sixth proportional control solenoid valve and may include a valve body and a valve spool, wherein the valve body of the sixth pressure control valve may include a first port that receives a control pressure from the sixth proportional control solenoid valve, a second port that receives the D range pressure from the third pressure switching valve, a third port that supplies the hydraulic pressure of the second port to the third fail-safe valve, a fourth port that exhausts the hydraulic pressure supplied to the third port, and a fifth port that receives a control pressure from the sixth pressure switching valve.

The sixth pressure switching valve may include a valve body and a valve spool, wherein the valve body of the sixth pressure switching valve may include a first port that receives the reduced pressure of the second reducing valve, a second port that receives the control pressure from the sixth proportional control solenoid valve at an opposite side of the first port, a third port that receives the partial pressure of the hydraulic pressure supplied to the third fail-safe valve through the sixth pressure control valve, a fourth port that connects the third port with the fifth port of the sixth pressure control valve, a fifth port that receives the line pressure, a sixth port that supplies the hydraulic pressure supplied through the fifth port to the fifth pressure control valve, a seventh port that selectively exhausts the hydraulic pressure of the fourth port, and an eighth port that selectively exhausts the hydraulic pressure of the sixth port.

The third fail-safe valve may include a valve body and a valve spool, wherein the valve body of the third fail-safe valve may include first and second ports that are formed at ends of the valve body and receive the line pressure as a control pressure, a third port that receives the D range pressure from the sixth pressure control valve, a fourth port that supplies the hydraulic pressure supplied through the third port to the fourth clutch, a fifth port that receives the operating pressure of the third clutch or the first brake, and a sixth port that exhausts the hydraulic pressure of the fourth port.

According the exemplary embodiment of the present invention, an automatic transmission having 6 friction members may be controlled to achieve eight forward speeds with live proportional control solenoid valves.

By controlling respective friction members by separate proportional control solenoid valves, hydraulic pressure control can become very precise. Also, a minimal number of spool valves are involved. Therefore, overall performance of an automatic transmission may be improved by minimizing shift shock, improving drivability, and enhancing fuel efficiency.

DETAILED DESCRIPTION OF PREFERRED EMBODIMENTS

An exemplary embodiment of the present invention will hereinafter be described in detail with reference to the accompanying drawings.

Figure 1:
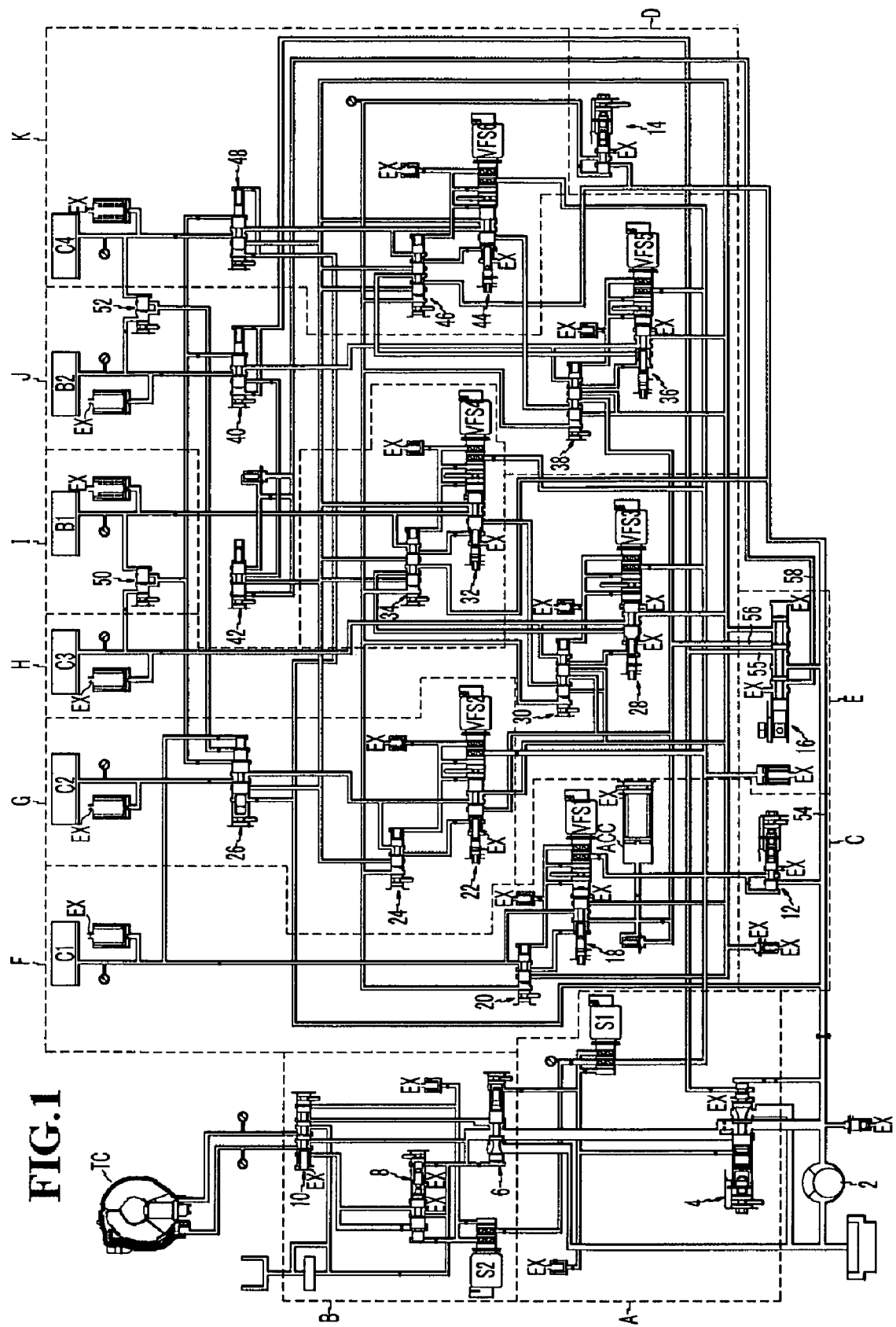
FIG. 1 is a schematic diagram of a hydraulic control system according to an exemplary embodiment of the present invention.

Referring to FIG. 1, a hydraulic control system according to an exemplary embodiment of the present invention includes a line pressure control portion A, a launch control portion B, first and second pressure reduction control portions C and D, a manual shift control portion E, a first clutch control portion F, a second clutch control portion G, a third clutch control portion H, a first brake control portion I, a second brake control portion J, and a fourth clutch control portion K. The hydraulic control system controls supply or release of hydraulic pressures to friction members, i.e., first, second, third, and fourth clutches C1, C2, C3, and C4, and first and second brakes B1 and B2, of a powertrain.

The line pressure control portion A includes a line regulator valve 4 and a proportional control solenoid valve S1 controlling the line regulator valve 4, such that a line pressure may be stably formed by a hydraulic pressure generated by a hydraulic pump 2 and the line pressure may be diversified depending on driving conditions of a vehicle for enhancement of fuel consumption.

The launch control portion B includes a torque converter control valve 6, a damper clutch control valve 8, a proportional control solenoid valve S2, and a lock-up switching valve 10. The torque converter control valve 6 enables a torque multiplication effect of a torque converter TC during acceleration, and it reduces the line pressure for better control of the damper clutch for enhancement of fuel consumption at a high rotation speed. The damper clutch control valve 8 controls engagement and disengagement of the damper clutch. The proportional control solenoid valve S2 controls the damper clutch control valve 8 according to an electrical signal from a transmission control unit TCU.

A first reducing valve 12 of the first pressure reduction control portion C reduces the hydraulic pressure supplied from the line regulator valve 4 so as to supply it to entire proportional control solenoid valves VFS1 to VFS6, S1, and S2.

A second reducing valve 14 of the second pressure reduction control portion D reduces the hydraulic pressure supplied from the line regulator valve 4 so as to supply it to first, second, third, fourth, fifth, and sixth pressure switching valves 20, 24, 30, 34, 38, and 46 that are controlled by the proportional control solenoid valves VFS1 to VFS6.

The manual shift control portion E includes a manual valve 16 that enables conversion of hydraulic lines according to manual shifting.

The first clutch control portion F includes a first pressure control valve 18 and a first pressure switching valve 20. The first pressure control valve 18 is integrally formed with the first proportional control solenoid valve VFS1, and the first pressure switching valve 20 switches hydraulic lines by the controlled pressure of the second reducing valve 14 and the controlled pressure of the first proportional control solenoid valve VFS1. By such a configuration, the first clutch control portion F selectively supplies at) operating pressure to the first clutch C1.

The second clutch control portion CG includes a second pressure control valve 22, a second pressure switching valve 24, and a first fail-safe valve 26. The second pressure control valve 22 is integrally formed with the second proportional control solenoid valve VFS2. The second pressure switching valve 24 switches hydraulic lines by the controlled pressure of the second proportional control solenoid valve VFS2 and the controlled pressure of the second reducing valve 14. The first fail-safe valve 26 switches hydraulic lines by control pressures supplied through four routes. By such a configuration, the second clutch control portion G selectively supplies an operating pressure to the second clutch C2.

The third clutch control portion H includes a third pressure control valve 28 and a third pressure switching valve 30. The third pressure control valve 28 is integrally formed with the third proportional control solenoid valve VFS3. The third pressure switching valve 30 switches hydraulic lines by the controlled pressure of the second reducing valve 14 and the controlled pressure of the third proportional control solenoid valve VFS3. By such a configuration, the third clutch control portion H selectively supplies an operating pressure to the third clutch C3.

The first brake control portion I includes a fourth pressure control valve 32 and a fourth pressure switching valve 34. The fourth pressure control valve 32 is integrally formed with the fourth proportional control solenoid valve VFS4. The fourth pressure switching valve 34 switches hydraulic lines by the controlled pressure of the second reducing valve 14 and the controlled pressure of the fourth proportional control solenoid valve VFS4. By such a configuration, the first brake control portion I selectively supplies an operating pressure to the first brake B1.

The second brake control portion J includes a fifth pressure control valve 36, a fifth pressure switching valve 38, a second fail-safe valve 40, and a switching valve 42. The fifth pressure control valve 36 is integrally formed with the fifth proportional control solenoid valve VFS5. The fifth pressure switching valve 38 switches hydraulic lines by the controlled pressure of the fifth proportional control solenoid valve VFS5 and the controlled pressure of the second reducing valve 14. The second fail-safe valve 40 is controlled by N-P range pressure and supplies an R range pressure and the operating pressure supplied from the fifth pressure control valve 36 to the second brake B2. The switching valve 42 is controlled by the R range pressure and supplies the R range pressure to the second brake B2 through the second fail-safe valve 40.

The fourth clutch control portion K includes a sixth pressure control valve 44, a sixth pressure switching valve 46, and a third fail-safe valve 48. The sixth pressure control valve 44 is integrally formed with the sixth proportional control solenoid valve VFS6. The sixth pressure switching valve 46 switches hydraulic lines by the controlled pressure of the sixth proportional control solenoid valve VFS6 and the controlled pressure of the second reducing valve 14. The third fail-safe valve 48 is controlled by line pressure or operating pressures of the third clutch C3 and the first brake B1, and supplies hydraulic pressure from the sixth pressure control valve 44 to the fourth clutch C4.

Between the third clutch C3 and the first brake B1, there is disposed a first shuttle valve 50 that can selectively supply operating pressures of the third clutch C3 and the first brake B1 to the first, second, and third fail-safe valves 26, 40, and 48 as control pressures thereof. Between the second brake B2 and the fourth clutch C4, there is disposed a second shuttle valve 52 that can selectively supply operating pressures of the second brake B2 and the fourth clutch C4 to the first fail-safe valve 26 as a control pressure thereof.

In more detail, as shown in FIG. 1, the manual valve 16 receives a hydraulic pressure supplied through a line pressure line 54 connected with the regulator valve 4 and supplies it through an N/D range pressure line 55, a forward range pressure (i.e. D range pressure) line 56 and a reverse range pressure line 58 depending on the driving ranges. The N/D range pressure line 55 is connected with the manual valve 16 such that the line pressure is supplied as an N/D range pressure into the N/D range pressure line 55 when the driving range is in the neutral N range or the forward D range.

The line pressure line 54 is connected with the first and second reducing valves 12 and 14 and the manual valve 16. In addition, the line pressure line 54 is also connected with the first and third fail-safe valves 26 and 48 to supply control pressures thereto. Furthermore the line pressure line 54 is also connected with the fourth pressure switching valve 34 and the sixth pressure switching valve 46.

The D range pressure line 56 is connected with the first and second pressure control valves 18 and 22 and the third and fifth pressure switching valves 30 and 38. The reverse range pressure line 58 is connected with the switching valve 42.

Figure 2:
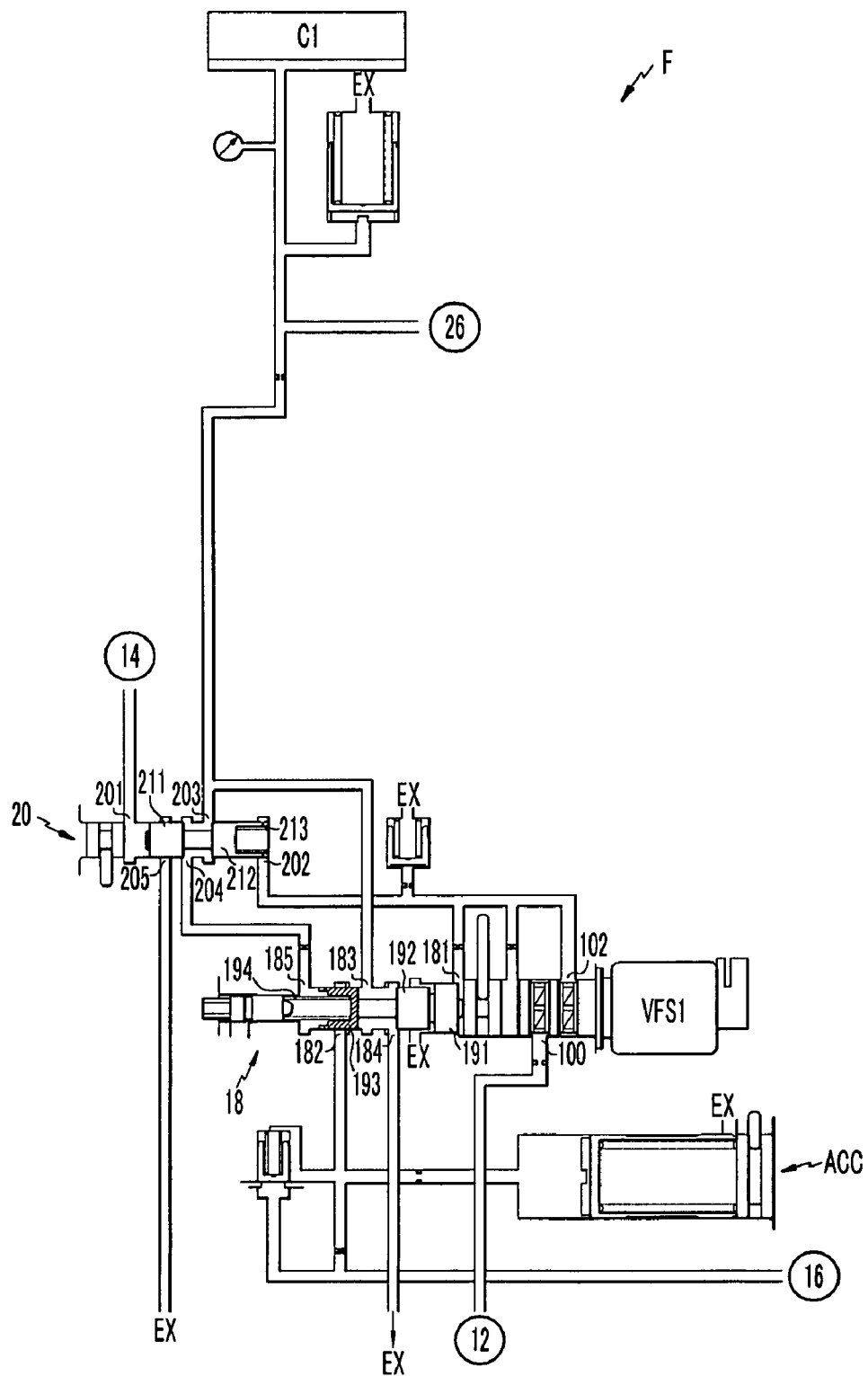
FIG. 2 is a detailed diagram of a first clutch control portion F of the hydraulic control system of FIG. 1.

FIG. 2 is a detailed diagram of a first clutch control portion F of the hydraulic control system according to an exemplary embodiment of the present invention. The first proportional control solenoid valve VFS1 includes an input port 100 that receives the reduced pressure of the first reducing valve 12 and an Output port 102 that supplies the hydraulic pressure received through the input port 100 to the first pressure control valve 18 and the first pressure switching valve 20.

The first pressure control valve 18 that is integrally formed with the first proportional control solenoid valve VFS1 includes a valve body and a valve spool.

The valve body of the first pressure control valve 18 includes first, second, third fourth, and fifth ports 181, 182, 183, 184, and 185. The first port 181 receives the controlled pressure of the first proportional control solenoid valve VEST. The second port 182 receives the D range pressure from the manual valve 16. The third port 183 supplies the hydraulic pressure of the second port 182 to the first clutch C1. The fourth port 184 exhausts the hydraulic pressure supplied to the first clutch C1. The fifth port 185 receives a partial pressure of the operating pressure supplied to the first clutch, through the first pressure switching valve 20.

The valve spool installed in the valve body of the first pressure control valve 18 includes first, second, and third lands 191, 192, and 193. The first land 191 receives the control pressure supplied through the first port 181. The second land 192 selectively opens or closes the fourth port 184. The third land 193 enables selective communication between the second port 182 and the third port 183, cooperatively with the second land 192.

An elastic member 194 is provided between the third land 193 and the valve body so as to form an elastic force for biasing the valve spool to the right in the drawing.

By such an arrangement, the valve spool moves left and right by the control pressure from the first proportional control solenoid valve VFS1 and the elastic force of the elastic member 194, such that the hydraulic pressure supplied through the second port 182 is controlled to be selectively supplied to the first clutch C1 through the third port 183 as an operating pressure.

The first pressure switching valve 20 includes a valve body and a valve spool.

The valve body of the first pressure switching valve 20 includes first, second, third, fourth, and fifth ports 201, 202, 203, 204, and 205. The first port 201 receives the reduced pressure of the second reducing valve 14. The second port 202 receives the control pressure from the first proportional control solenoid valve VFS1 at an opposite side of the first port 201. The third port 203 receives the partial pressure of the operating pressure supplied to the first clutch C1 through the first pressure control valve 18. The fourth port 204 is connected with the fifth port 185 of the first pressure control valve 18

The fifth port 205 selectively communicates with the fourth port 204.

The valve spool installed in the valve body of the first pressure switching valve 20 includes first and second lands 211 and 212. The first land 211 selectively opens and closes the fifth port 205 by the control pressure supplied through the first port 201. The second land 212 is controlled by the control pressure supplied through the second port 202 so that the second land 212 selectively opens or closes the third port 203, and at the same time, it selectively enables communication of the fourth and fifth ports 204 and 205, cooperatively with the first land 211.

An elastic member 213 is provided between the second land 212 and the valve body so as to form an elastic force for biasing the valve spool toward the first port 201.

By such an arrangement, when the first proportional control solenoid valve VFS1 is turned on, the valve spool moves to the left in the drawing so that the third port 203 is closed and the fourth and fifth ports 204 and 205 communicate with each other. When the first proportional control solenoid valve VFS1 is turned off, the valve spool moves to the right in the drawing by the pressure of the first port 201 so that the third and fourth ports 203 and 204 communicate with each other.

The reference symbol ACC in FIG. 2 denotes an accumulator that reduces pulsation of a hydraulic pressure.

Figure 3:
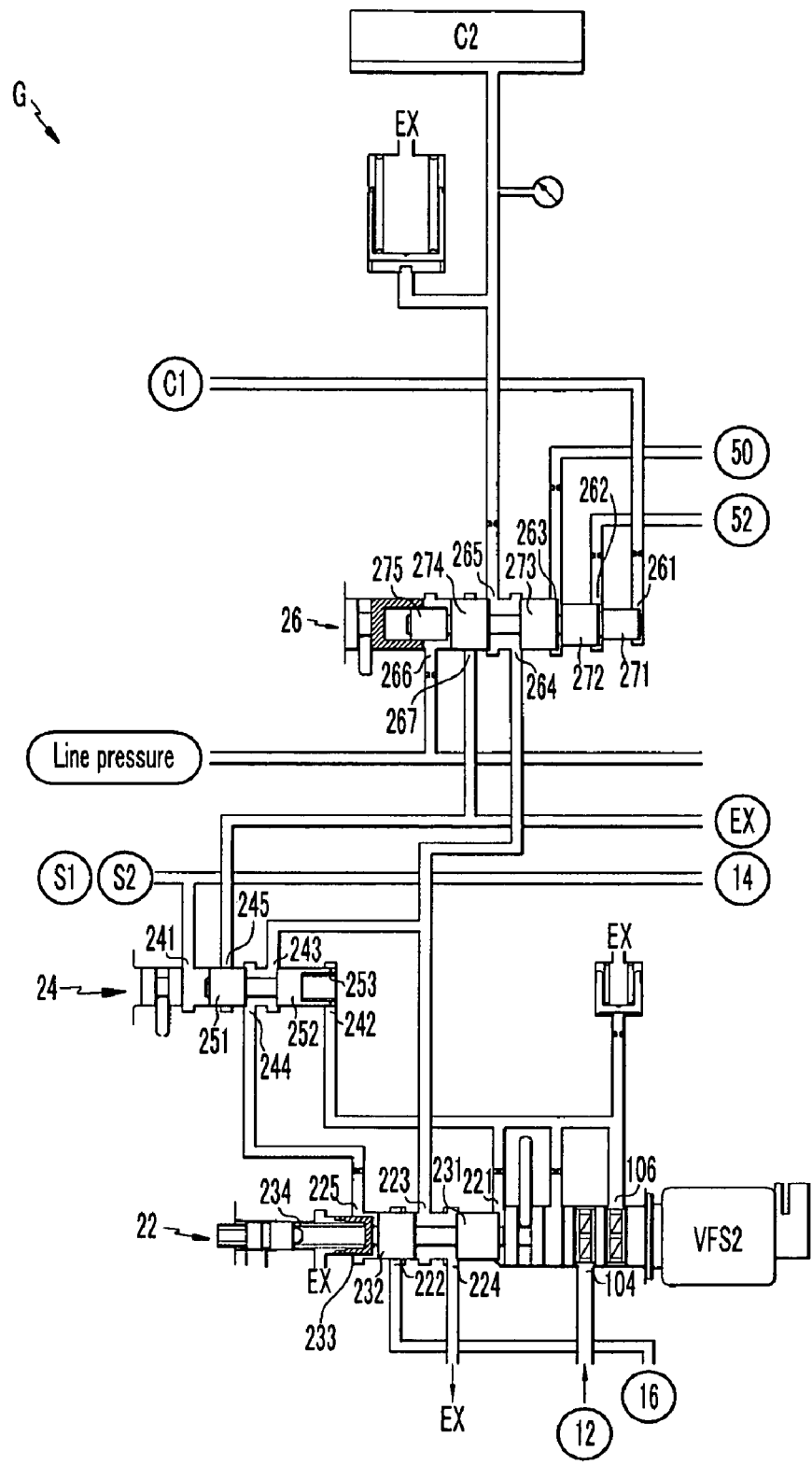
FIG. 3 is a detailed diagram of a second clutch control portion G of the hydraulic control system of FIG. 1.

FIG. 3 is a detailed diagram of a second clutch control portion G of the hydraulic control system according to an exemplary embodiment of the present invention.

The second proportional control solenoid valve VFS2 includes an input port 104 and an output port 106. The input port 104 receives the reduced pressure of the first reducing valve 12. When turned on, the output port 106 supplies the pressure of the input port 104 to the second hydraulic pressure control valve 22 and the second pressure switching valve 24.

The second pressure control valve 22 that is integrally formed with the second proportional control solenoid valve VFS2 includes a valve body and a valve spool.

The valve body of the second pressure control valve 22 includes first, second, third, fourth, and fifth ports 221, 222, 223, 224, and 225. The first port 221 receives a control pressure from the second proportional control solenoid valve VFS2. The second port 222 receives the D range pressure from the manual valve 16. The third port 223 supplies the hydraulic pressure of the second port 222 to the second pressure switching valve 24 and the first fail-safe valve 26. The fourth port 224 exhausts the hydraulic pressure supplied to the third port 223. The fifth port 225 receives a partial pressure of the hydraulic pressure supplied to the second pressure switching valve 24.

The valve spool of the second pressure control valve 22 includes first, second, and third lands 231, 232, and 233. The first land 231 receives the control pressure supplied from the first port 221. The second land 232 selectively opens or closes the fourth port 224. The third land 233 selectively enables communication of the second and third ports 222 and 223, cooperatively with the second land 232.

An elastic member 234 is provided between the third land 223 and the valve body so as to form an elastic force for biasing the valve spool to the right in the drawing.

By such an arrangement, the valve spool moves left and right by the control pressure of the second proportional control solenoid valve VFS2 and the elastic force of the elastic member 234, such that the hydraulic pressure supplied through the second port 222 is controlled to be selectively supplied to the second pressure switching valve 24 and the first fail-safe valve 26 through the third port 223.

The second pressure switching valve 24 includes a valve body and a valve spool.

The valve body of the second pressure switching valve 24 includes first, second, third, fourth, and fifth ports 241, 242, 243, 244, and 245. The first port 241 receives the reduced pressure of the second reducing valve 14. The second port 242 receives the control pressure from the second proportional control solenoid valve VFS2 at an opposite side of the first port 241. The third port 243 receives a partial pressure of the hydraulic pressure supplied to the first fail-safe valve 26. The fourth port 244 connects the third port 243 with the fifth port 225 of the second pressure control valve 22. The fifth port 245 exhausts the hydraulic pressure supplied to the fourth port 244.

The valve spool installed in the valve body of the second pressure switching valve 24 includes first and second lands 251 and 252. The first land 251 selectively opens and closes the Fifth port 245 by the control pressure supplied through the first port 241. The second land 252 selectively connects the fourth port 244 to the third port 243 and the fifth port 245, cooperatively with the first land 251.

An elastic member 253 is provided between the second land 252 and the valve body so as to form an elastic force for biasing the valve spool toward the first port 241.

The first fail-safe valve 26 is controlled by control pressures supplied through four routes so as to supply an operating pressure to the second clutch C2.

The valve body of the first fail-safe valve 26 includes first, second, third, fourth, fifth, sixth, and seventh ports 261, 262, 263, 264, 265, 266, and 267. The first port 261 receives a partial pressure of the operating pressure of the first clutch C1 as a control pressure. The second port 262 receives the operating pressure of the fourth clutch C4 or the second brake B2 as a control pressure. The third port 263 receives the operating pressure of the third clutch C3 or the first brake B1 as a control pressure.

The fourth port 264 receives the hydraulic pressure from the second pressure control valve 22. The fifth port 265 supplies the hydraulic pressure supplied through the fourth port 264 to the second clutch C2. The sixth port 266 receives the line pressure as a control pressure.

The seventh port 267 exhausts the hydraulic pressure supplied to the fifth port 265.

The valve spool installed in the valve body of the first fail-safe valve 26 includes first, second, third, fourth, and fifth lands 271, 272, 273, 274, and 275. The first land 271 receives the control pressure of the first port 261. The second land 272 receives the control pressure of the second port 262. The third land 273 receives the control pressure of the third port 263. The fourth land 274 receives the control pressure of the sixth port 266 and enables selective communication of the fourth port 264 to the fifth port 265. The fifth land 275 receives the control pressure of the sixth port 266.

According to such an arrangement, the first fail-safe valve 26 is controlled by control pressures supplied through the first, second, third, and sixth ports 261, 262, 263, and 266, and supplies the hydraulic pressure supplied from the second pressure control valve 22 to the second clutch C2 as an operating pressure thereof.

Figure 4:
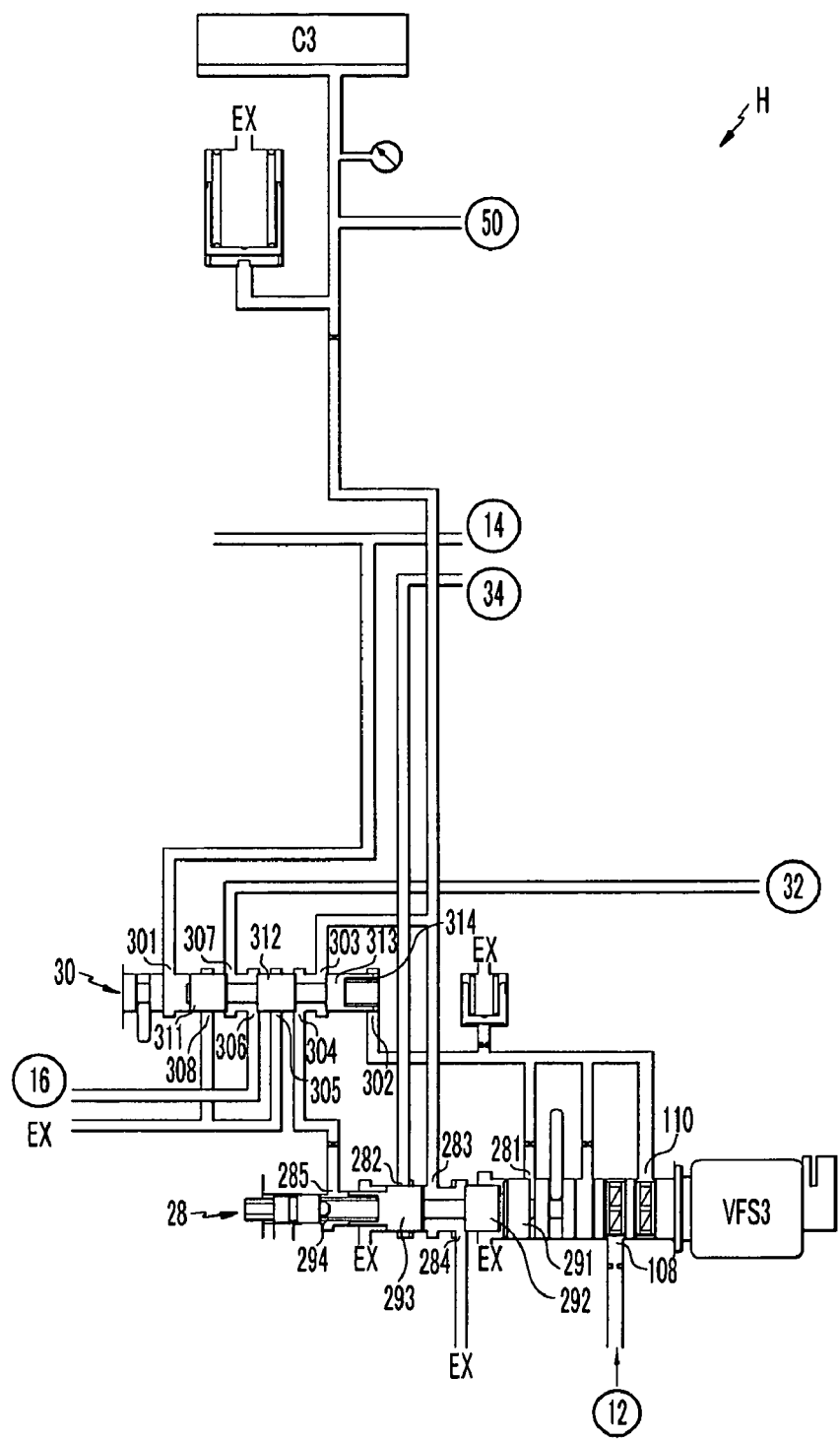
FIG. 4 is a detailed diagram of a third clutch control portion H of the hydraulic control system of FIG. 1.

FIG. 4 is a detailed diagram of a third clutch control portion H of the hydraulic control system according to an exemplary embodiment of the present invention.

The third proportional control solenoid valve VFS3 includes an input port 108 and an output port 110. The input port 108 receives the reduced pressure of the First reducing valve 12. When turned off, the output port 110 supplies the hydraulic pressure of the input port 108 to the third pressure control valve 28 and the third pressure switching valve 30.

The third pressure control valve 28 that is integrally formed with the third proportional control solenoid valve VFS3 includes a valve body and a valve spool.

The valve body of the third pressure control valve 28 includes first, second, third, fourth, and fifth ports 281, 282, 283, 284, and 285. The first port 281 receives a control pressure from the third proportional control solenoid valve VFS3. The second port 282 receives the hydraulic pressure from the fourth pressure switching valve 34. The third port 283 supplies the hydraulic pressure of the second port 282 to the third clutch C3. The fourth port 284 exhausts the hydraulic pressure supplied to the third port 283. The fifth port 285 receives a control pressure from the third pressure switching valve 30.

The valve spool installed in the valve body of the third pressure control valve 28 includes first, second, and third lands 291, 292, and 293. The first land 291 receives the control pressure supplied through the first port 281. The second land 292 is fixed with and moves together with the first land 291. The third land 293 selectively connects the third port 283 to the second port 282 and the fourth port 284, cooperatively with the second land 292.

An elastic member 294 is provided between the third land 293 and the valve body so as to form an elastic force for biasing the valve spool to the right in the drawing.

By such an arrangement, the valve spool moves left and right by the control pressure from the third proportional control solenoid valve VFS3 and the elastic force of the elastic member 294, such that the hydraulic pressure supplied through the second port 282 is controlled to be selectively supplied to the third clutch C3 through the third port 283 as an operating pressure.

The third pressure switching valve 30 includes a valve body and a valve spool.

The valve body of the third pressure switching valve 30 includes first, second, third, fourth, fifth, sixth, seventh, and eight ports 301, 302, 303, 304, 305, 306, 307, and 308. The first port 301 receives the reduced pressure of the second reducing valve 14. The second port 302 receives the control pressure from the third proportional control solenoid valve VFS3 at an opposite side of the first port 301. The third port 303 receives the partial pressure of the hydraulic pressure supplied to the third clutch C3 through the third pressure control valve 28. The fourth port 304 connects the third port 303 with the fifth port 285 of the third pressure control valve 28. The fifth port 305 selectively communicates with the fourth port 304 so as to exhaust the hydraulic pressure of the fourth port 304. The sixth port 306 receives the D range pressure from the manual valve. The seventh port 307 selectively supplies the hydraulic pressure of the sixth port 306 to the fourth pressure control valve 32. The eighth port 308 selectively exhausts the hydraulic pressure of the seventh port 307.

The valve spool installed in the valve body of the third pressure switching valve 30 includes first, second, and third lands 311, 312, and 313. The first land 311 selectively opens and closes the eighth port 308 by the control pressure supplied through the first port 301. The second land 312 enables selective communication of the seventh port 307 to the sixth port 306 or the eighth port 308, cooperatively with the first land 311. The third land 313 is controlled by the control pressure supplied through the second port 302 so that the third land 313 selectively opens or closes the third port 303 and enables selective communication of the fourth port 304 to the third port 303 and the fifth port 305, cooperatively with the third land 313.

An elastic member 314 is provided between the third land 313 and the valve body so as to form an elastic force for biasing the valve spool toward the first port 301.

By such an arrangement, when the third proportional control solenoid valve VFS3 is turned on, the valve spool moves to the left in the drawing so that the third port 303 is closed while the fourth and fifth ports 304 and 305 communicate with each other and the seventh and eighth ports 307 and 308 communicate with each other. When the third proportional control solenoid valve VFS3 is turned off, the valve spool moves to the right in the drawing by the pressure of the first port 301 so that the third and fourth ports 303 and 304 communicate with each other and the sixth and seventh ports 306 and 307 communicate with each other.

Figure 5:
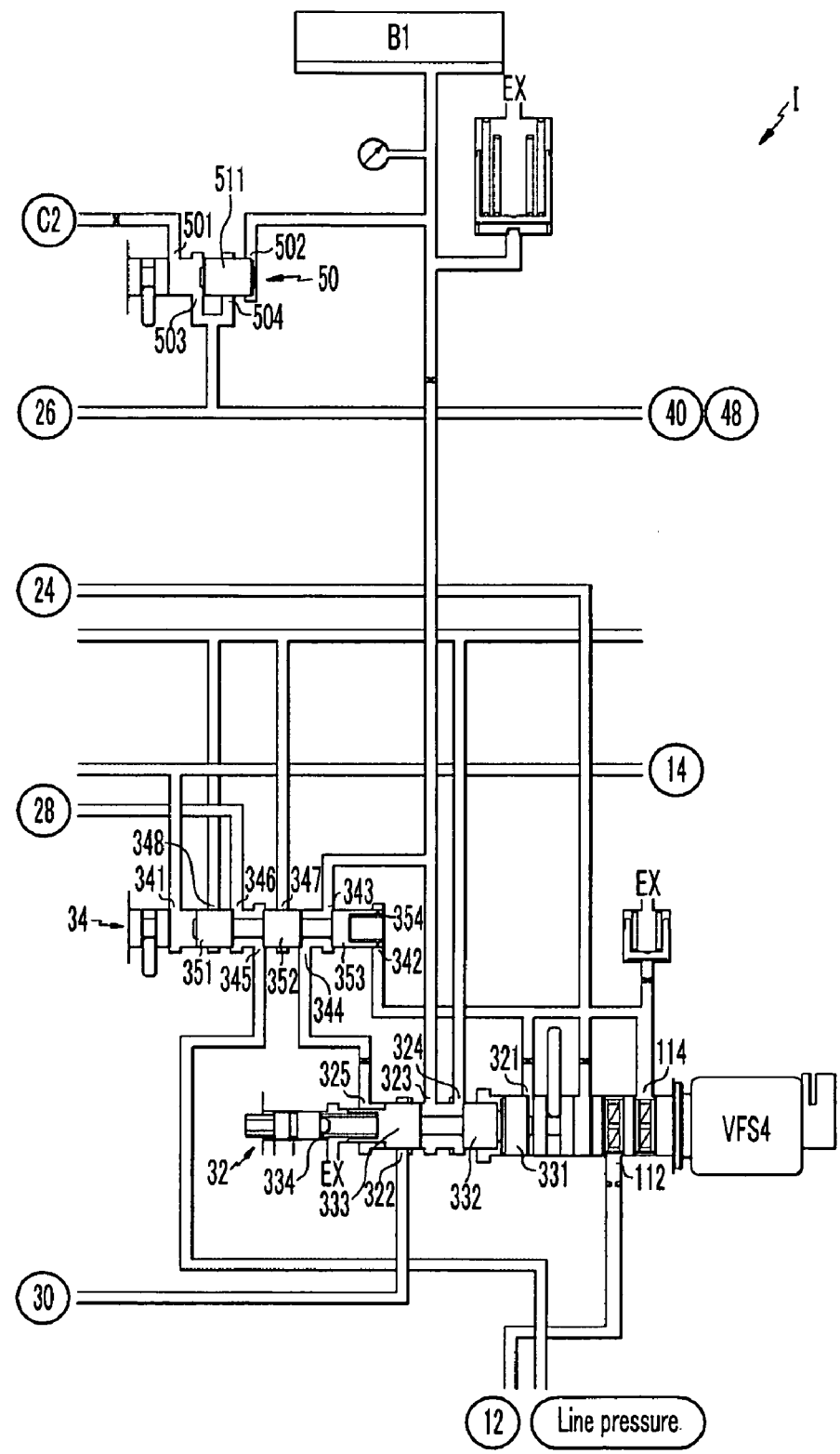
FIG. 5 is a detailed diagram of a first brake control portion I of the hydraulic control system of FIG. 1.

FIG. 5 is a detailed diagram of a first brake control portion I of the hydraulic control system according to an exemplary embodiment of the present invention.

The fourth proportional control solenoid valve VFS4 includes an input port 112 and an output port 114. The input port 112 receives the reduced pressure of the first reducing valve 12. When turned off, the output port 114 supplies the hydraulic pressure of the input port 112 to the fourth pressure control valve 32 and the fourth pressure switching valve 34.

The fourth pressure control valve 32 that is integrally formed with the fourth proportional control solenoid valve VFS4 includes a valve body and a valve spool.

The valve body of the fourth pressure control valve 32 includes first, second, third, fourth, and fifth ports 321, 322, 323, 324, and 325. The first port 321 receives a control pressure from the fourth proportional control solenoid valve VFS4. The second port 322 receives the hydraulic pressure from the third pressure switching valve 30. The third port 323 supplies the hydraulic pressure of the second port 322 to the first brake B1. The fourth port 324 exhausts the hydraulic pressure supplied to the third port 323. The fifth port 325 receives a control pressure from the fourth pressure switching valve 34.

The valve spool installed in the valve body of the fourth pressure control valve 32 includes first, second, and third lands 331, 332, and 333. The first land 331 receives the control pressure supplied through the first port 321. The second land 332 is fixed with and moves together with the first land 331. The third land 333 selectively connects the third port 323 to the second port 322 and the fourth port 324, cooperatively with the second land 332.

An elastic member 334 is provided between the third land 333 and the valve body so as to form an elastic force for biasing the valve spool to the right in the drawing.

By such an arrangement, the valve spool moves left and right by the control pressure from the fourth proportional control solenoid valve VFS4 and the elastic force of the elastic member 334, such that the hydraulic pressure supplied through the second port 322 is controlled to be selectively supplied to the first brake B1 through the third port 323 as an operating pressure.

The fourth pressure switching valve 34 includes a valve body and a valve spool.

The valve body of the fourth pressure switching valve 34 includes first, second, third, fourth, fifth, sixth, seventh, and eighth ports 341, 342, 343, 344, 345, 346, 347, and 348. The first port 341 receives the reduced pressure of the second reducing valve 14. The second port 342 receives the control pressure from the fourth proportional control solenoid valve VFS4 at an opposite side of the first port 341. The third port 343 receives the partial pressure of the hydraulic pressure supplied to the first brake B1 through the fourth pressure control valve 32. The fourth port 344 connects the third port 343 with the fifth port 325 of the fourth pressure control valve 32. The fifth port 345 receives the line pressure. The sixth port 346 supplies the hydraulic pressure supplied through the fifth port 345 to the third pressure control valve 28. The seventh port 347 selectively exhausts the hydraulic pressure of the fourth port 344. The eighth port 348 selectively exhausts the hydraulic pressure of the sixth port 346.

The valve spool installed in the valve body of the fourth pressure switching valve 34 includes first, second, and third lands 351, 352, and 353. The first land 351 selectively opens and closes the eighth port 348 by the control pressure supplied through the first port 341. The second land 352 enables selective communication of the fifth port 345 to the sixth port 346, cooperatively with the first land 351. The third land 353 is controlled by the control pressure supplied through the second port 342 so that the third land 353 selectively opens or closes the third port 343 and enables selective communication of the fourth port 344 to the third port 343 and the seventh port 347, cooperatively with the second land 352.

An elastic member 354 is provided between the third land 353 and the valve body so as to form an elastic force for biasing the valve spool toward the first port 341.

By such an arrangement, when the fourth proportional control solenoid valve VFS4 is turned on, the valve spool moves to the left in the drawing so that the third port 343 is closed while the fourth and seventh ports 344 and 347 communicate with each other and the sixth and eighth ports 346 and 348 communicate with each other. When the fourth proportional control solenoid valve VFS4 is turned off, the valve spool moves to the right in the drawing by the pressure of the first port 341 so that the third and fourth ports 343 and 344 communicate with each other and the fifth and sixth ports 345 and 346 communicate with each other.

The first shuttle valve 50 supplies a partial pressure of the operating pressures of the third clutch C3 and the first brake B1 to the first, second, and third fail-safe valves 26, 40, and 48 as their control pressures.

The first shuttle valve 50 includes a valve body and a valve spool.

The valve body of the first shuttle valve 50 includes first, second, third, and fourth ports 501, 502, 503, and 504. The first port 501 communicates with the third clutch C3. The second port 502 communicates with the first brake B1. The third port 503 selectively communicates with the first port 501. The fourth port 504 selectively communicates with the second port 502.

The valve spool installed in the valve body of the first shuttle valve 50 includes a single land 511. One side of the land 511 receives a control pressure supplied through the first port 501, and enables communication of the first port 501 to the third port 503. The other side of the land 511 receives a control pressure supplied through the second port 502, and enables communication of the second port 502 to the fourth port 504. By such an arrangement the first shuttle valve 50 may supply a partial pressure of the operating pressures of the third clutch C3 and the first brake B1 to the first, second, and third fail-safe valves 26, 40, and 48 as their control pressures.

Figure 6:
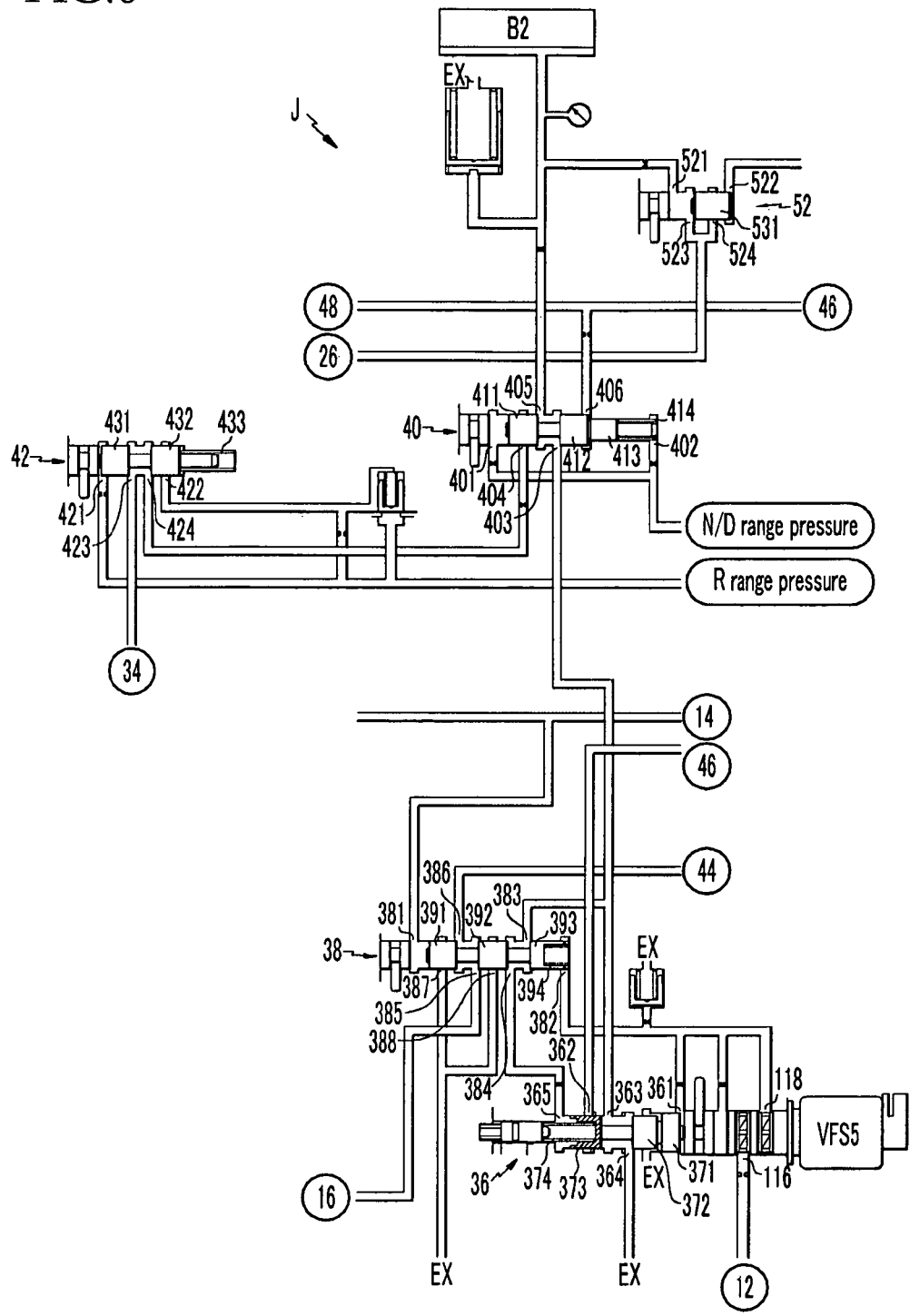
FIG. 6 is a detailed diagram of a second brake control portion J of the hydraulic control system of FIG. 1.

FIG. 6 is a detailed diagram of a second brake control portion J of the hydraulic control system according to an exemplary embodiment of the present invention.

The fifth proportional control solenoid valve VFS5 includes an input port 116 and an output port 118. The input port 116 receives the reduced pressure of the first reducing valve 12. When turned on, the output port 118 supplies the pressure of the input port 116 to the fifth pressure control valve 36 and the fifth pressure switching valve 38.

The fifth pressure control valve 36 that is integrally formed with the fifth proportional control solenoid valve VFS5 includes a valve body and a valve spool.

The valve body of the fifth pressure control valve 36 includes first, second third, fourth, and fifth ports 361, 362, 363, 364, and 365. The first port 361 receives a control pressure from the fifth proportional control solenoid valve VFS5. The second port 362 receives the line pressure from the sixth pressure switching valve 46. The third port 363 supplies the hydraulic pressure of the second port 362 to the second fail-safe valve 40. The fourth port 364 exhausts the hydraulic pressure supplied to the third port 363. The fifth port 365 receives a partial pressure of the operating pressure supplied to the fifth pressure switching valve 38.

The valve spool installed in the valve body of the fifth pressure control valve 36 includes first, second, and third lands 371, 372, and 373. The first land 371 receives the control pressure supplied through the first port 361. The second land 372 selectively opens or closes the fourth port 364. The third land 373 enables selective communication between the second port 362 and the third port 363, cooperatively with the second land 372.

An elastic member 374 is provided between the third land 373 and the valve body so as to form an elastic force for biasing the valve spool to the right in the drawing.

By such an arrangement, the valve spool moves left and right by the control pressure from the fifth proportional control solenoid valve VFS5 and the elastic force of the elastic member 374, such that the hydraulic pressure supplied through the second port 362 is controlled to be selectively supplied to the second fail-safe valve 40 through the third port 363.

The fifth pressure switching valve 38 includes a valve body and a valve spool.

The valve body of the fifth pressure switching valve 38 includes first, second, third, fourth, fifth, sixth, seventh, and eighth ports 381, 382, 383, 384, 385, 386, 387, and 388. The first port 381 receives the reduced pressure of the second reducing valve 14. The second port 382 receives the control pressure from the fifth proportional control solenoid valve VFS5 at an opposite side of the first port 381. The third port 383 receives the partial pressure of the hydraulic pressure supplied to the second fail-safe valve 40 through the fifth pressure control valve 36. The fourth port 384 selectively communicates with the third port 383 and is connected with the fifth port 365 of the fifth pressure control valve 36. The fifth port 385 is connected with the manual valve 16 so as to receive the D range pressure. The sixth port 386 supplies the D range pressure supplied to the fifth port 385 to the sixth pressure control valve 44. The seventh and eighth ports 387 and 388 are exhaust ports.

The valve spool installed in the valve body of the fifth pressure switching valve 38 includes first, second, and third lands 391, 392, and 393.

The first land 391 receives the control pressure supplied through the first port 381. The second land 392 enables selective communication of the sixth port 386 to the fifth port 385 and the seventh port 387. The third land 393 is controlled by the control pressure supplied through the second port 382 so that the third land 393 enables selective communication of the third port 343 and the fourth port 384.

An elastic member 394 is provided between the third land 393 and the valve body so as to form an elastic force for biasing the valve spool toward the first port 381.

The second fail-safe valve 40 controls the hydraulic pressure supplied to the second brake B2, and includes a valve body and a valve spool.

The valve body of the second fail-safe valve 40 includes first, second, third, fourth, fifth, and sixth ports 401, 402, 403, 404, 405, and 406. The first and second ports 401 and 402 are formed at ends of the valve body and receive an N/D range pressure as control pressures. The third port 403 receives the hydraulic pressure from the Fifth pressure control valve 36. The fourth port 404 receives the reverse range pressure from the switching valve 42. The fifth port 405 selectively supplies the hydraulic pressure of the third and fourth ports 403 and 404 to the second brake B2. The sixth port 406 receives the operating pressure of the third clutch C3 or the first brake B1 as a control pressure.

The valve spool installed in the valve body of the second fail-safe valve 40 includes first, second, and third lands 411, 412, and 413. The first land 411 receives the control pressure of the first port 401. The second land 412 enables selective communication of the fifth port 405 to the third port 403 and the fourth port 404, cooperatively with the first land 411. The third land 413 receives the control pressure of the second port 412.

An elastic member 414 is provided between the third land 413 and the valve body.

By such an arrangement the second fail-safe valve 40 selectively supplies the hydraulic pressure of the third port 403 and the fourth port 404 to the second brake 132.

The switching valve 42 includes a valve body and a valve spool.

The valve body of the switching valve 42 includes first, second, third, and fourth ports 421, 422, 423, and 424. The first and second ports 421 and 422 receive the R range pressure as control pressures. The third port 423 receives the hydraulic pressure from the fourth pressure switching valve 34. The fourth port 424 supplies the hydraulic pressure of the third port 423 to the second fail-safe valve 40.

The valve spool installed in the valve body of the switching valve 42 includes first and second lands 431 and 432. The first land 431 receives the control pressure of the first port 421. The second land 432 enables selective communication of the third port 423 and the fourth port 424, cooperatively with the first land 431.

An elastic member 433 is provided between the second land 432 and the valve body.

By such an arrangement, the switching valve 42 selectively supplies the hydraulic pressure of the third port 423 to the second fail-safe valve 40 through the fourth port 424.

The second shuttle valve 52 supplies a partial pressure of the operating pressures of the fourth clutch C4 and the second brake 132 to the first fail-safe valve 26 as a control pressure thereof.

The second shuttle valve 52 includes a valve body and a valve spool. The valve body of the second shuttle valve 52 includes first, second, third, and fourth ports 521, 522, 523 and 524. The first port 521 communicates with the second brake B2. The second port 522 communicates with the fourth clutch C4. The third port 523 selectively communicates with the first port 521. The fourth port 524 selectively communicates with the second port 522.

The valve spool installed in valve body of the second shuttle valve 52 includes a single land 531. One side of the land 531 receives a control pressure supplied through the first port 521, and enables communication of the first port 521 to the third port 523. The other side of the land 531 receives a control pressure supplied through the second port 522, and enables communication of the second port 522 to the fourth port 524. By such an arrangement, the second shuttle valve 52 may supply a partial pressure of the operating pressures of the fourth clutch C4 and the second brake B2 to the first fail-safe valve 26 as a control pressure thereof.

Figure 7:
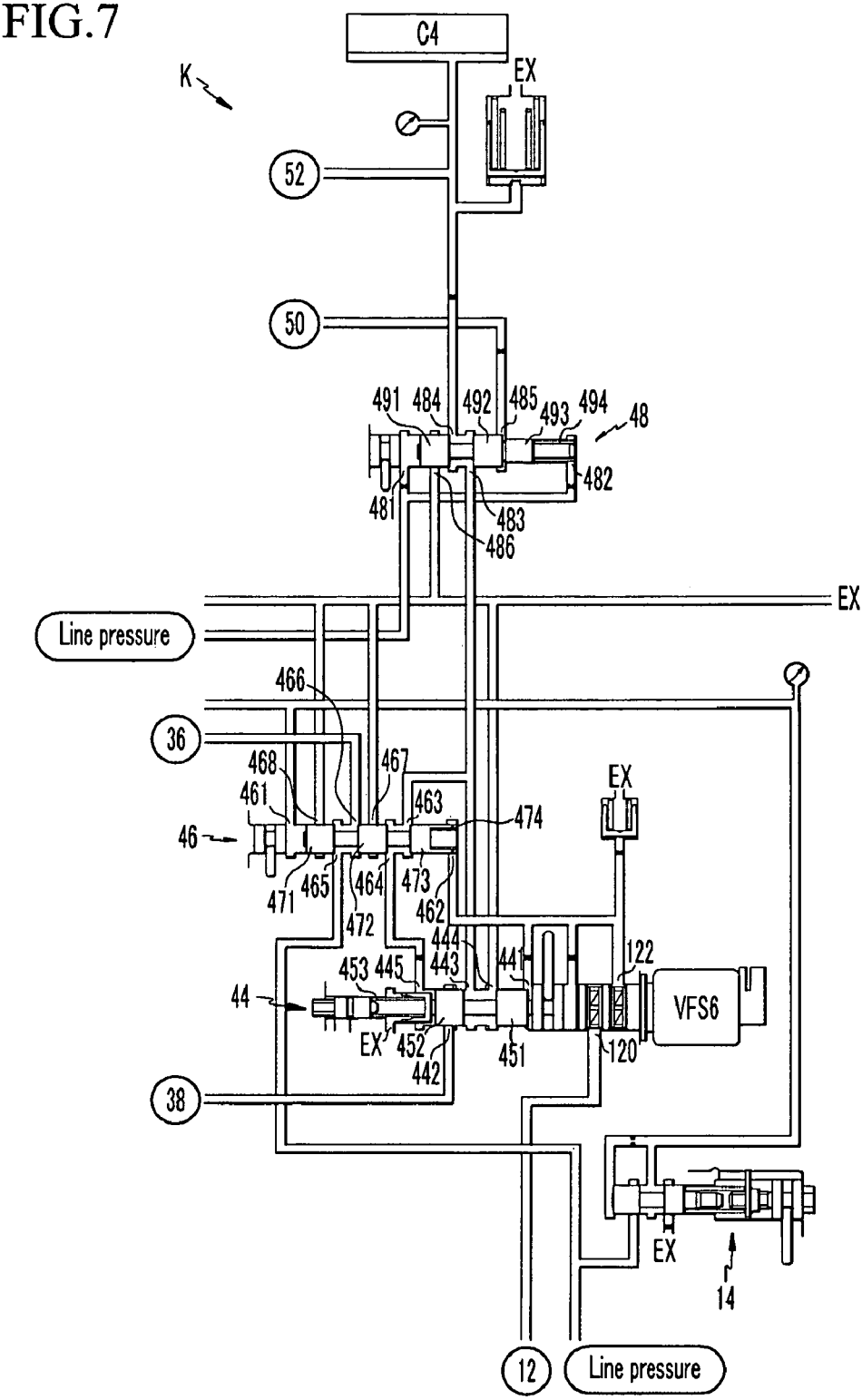
FIG. 7 is a detailed diagram of a fourth clutch control portion K of the hydraulic control system of FIG. 1.

FIG. 7 is a detailed diagram of a fourth clutch control portion K of the hydraulic control system according to an exemplary embodiment of the present invention.

The sixth proportional control solenoid valve VFS6 includes an input port 120 and an output port 122. The input port 120 receives the reduced pressure of the first reducing valve 12. When turned off, the output port 122 supplies the hydraulic pressure of the input port 120 to the sixth pressure control valve 44 and the sixth pressure switching valve 46.

The sixth pressure control valve 44 that is integrally formed with the sixth proportional control solenoid valve VFS2 includes a valve body and a valve spool.

The valve body of the sixth pressure control valve 44 includes first, second, third, fourth, and fifth ports 441, 442, 443, 444, and 445. The first port 441 receives a control pressure from the sixth proportional control solenoid valve VFS6. The second port 442 receives the D range pressure from the fifth pressure switching valve 38. The third port 443 supplies the hydraulic pressure of the second port 442 to the third fail-safe valve 48. The fourth port 444 exhausts the hydraulic pressure supplied to the third port 443. The fifth port 445 receives a control pressure from the sixth pressure switching valve 46.

The valve spool installed in the valve body includes first and second lands 451 and 452. The first land 451 receives the control pressure supplied through the first port 441. The second land 452 receives the control pressure of the fifth port 445 and enables selective communication of the third port 443 to the second port 442 and the fourth port 444 cooperatively with the first land 451.

An elastic member 453 is provided between the second land 452 and the valve body so as to form an elastic force for biasing the valve spool to the right in the drawing.

By such an arrangement, the valve spool moves left and right by the control pressure from the sixth proportional control solenoid valve VFS6 and the elastic force of the elastic member 453, such that the hydraulic pressure supplied through the second port 442 is controlled to be selectively supplied to the third fail-safe valve 48 through the third port 443 as an operating pressure.

The sixth pressure switching valve 46 includes a valve body and a valve spool.

The valve body of the sixth pressure switching valve 46 includes first, second, third, fourth, fifth, sixth, seventh, and eighth ports 461, 462, 463, 464, 465, 466, 467, and 468. The first port 461 receives the reduced pressure of the second reducing valve 14. The second port 462 receives the control pressure from the sixth proportional control solenoid valve VFS6 at an opposite side of the first port 461. The third port 463 receives the partial pressure of the hydraulic pressure supplied to the third fail-safe valve 48 through the sixth pressure control valve 44. The fourth port 464 connects the third port 463 with the fifth port 445 of the sixth pressure control valve 44. The fifth port 465 receives the line pressure. The sixth port 466 supplies the hydraulic pressure supplied through the fifth port 465 to the fifth pressure control valve 36. The seventh port 467 selectively exhausts the hydraulic pressure of the fourth port 464. The eighth port 468 selectively exhausts the hydraulic pressure of the sixth port 466.

The valve spool installed in the valve body of the sixth pressure switching valve 46 includes first, second, and third lands 471, 472, and 473. The first land 471 selectively opens and closes the eighth port 468 by the control pressure supplied through the first port 461. The second land 472 enables selective communication of the fifth port 465 to the sixth port 466, cooperatively with the first land 471. The third land 473 is controlled by the control pressure supplied through the second port 462 so that the third land 473 selectively opens or closes the third port 463 and enables selective communication of the fourth port 464 to the third port 463 and the seventh port 467, cooperatively with the second land 472.

An elastic member 474 is provided between the third land 473 and the valve body so as to form an elastic force for biasing the valve spool toward the first port 461.

By such an arrangement, when the sixth proportional control solenoid valve VFS6 is turned on, the valve spool moves to the left in the drawing so that the third port 463 is closed while the fourth port 464 and the seventh port 467 communicate with each other and the sixth port 466 and the eighth port 468 communicate with each other. When the sixth proportional control solenoid valve VFS6 is turned of the valve spool moves to the right in the drawing by the pressure of the first port 461 so that the third and fourth ports 463 and 464 communicate with each other and the fifth and sixth ports 465 and 466 communicate with each other.

The third fail-safe valve 48 controls the hydraulic pressure supplied to the fourth clutch C4, and includes a valve body and a valve spool.

The valve body of the third fail-safe valve 48 includes first, second, third, fourth, fifth, and sixth ports 481, 482, 483, 484, 485, and 486. The first and second ports 481 and 482 are formed at ends of the valve body and receive the line pressure as a control pressure. The third port 483 receives the D range pressure from the sixth pressure control valve 44. The fourth port 484 supplies the hydraulic pressure supplied through the third port 483 to the fourth clutch C4. The fifth port 485 receives the operating pressure of the third clutch C3 or the first brake B1. The sixth port 486 exhausts the hydraulic pressure of the fourth port 484.

The valve spool installed in the valve body of the third fail-safe valve 48 includes first, second, and third lands 491, 492, and 493. The first land 491 receives the control pressure of the first port 481. The second land 492 enables selective communication of the fourth port 484 to the third and sixth ports 483 and 486, cooperatively with the first land 491. The third land 493 receives the control pressure of the second port 482.

An elastic member 494 is provided between the third land 493 and the valve body.

By such an arrangement, the third fail-safe valve 48 enables hydraulic line conversion by control pressures supplied through the first and second ports 481 and 482, and selectively supplies the hydraulic pressure of the third port 483 to the fourth clutch C4.

Figure 8:
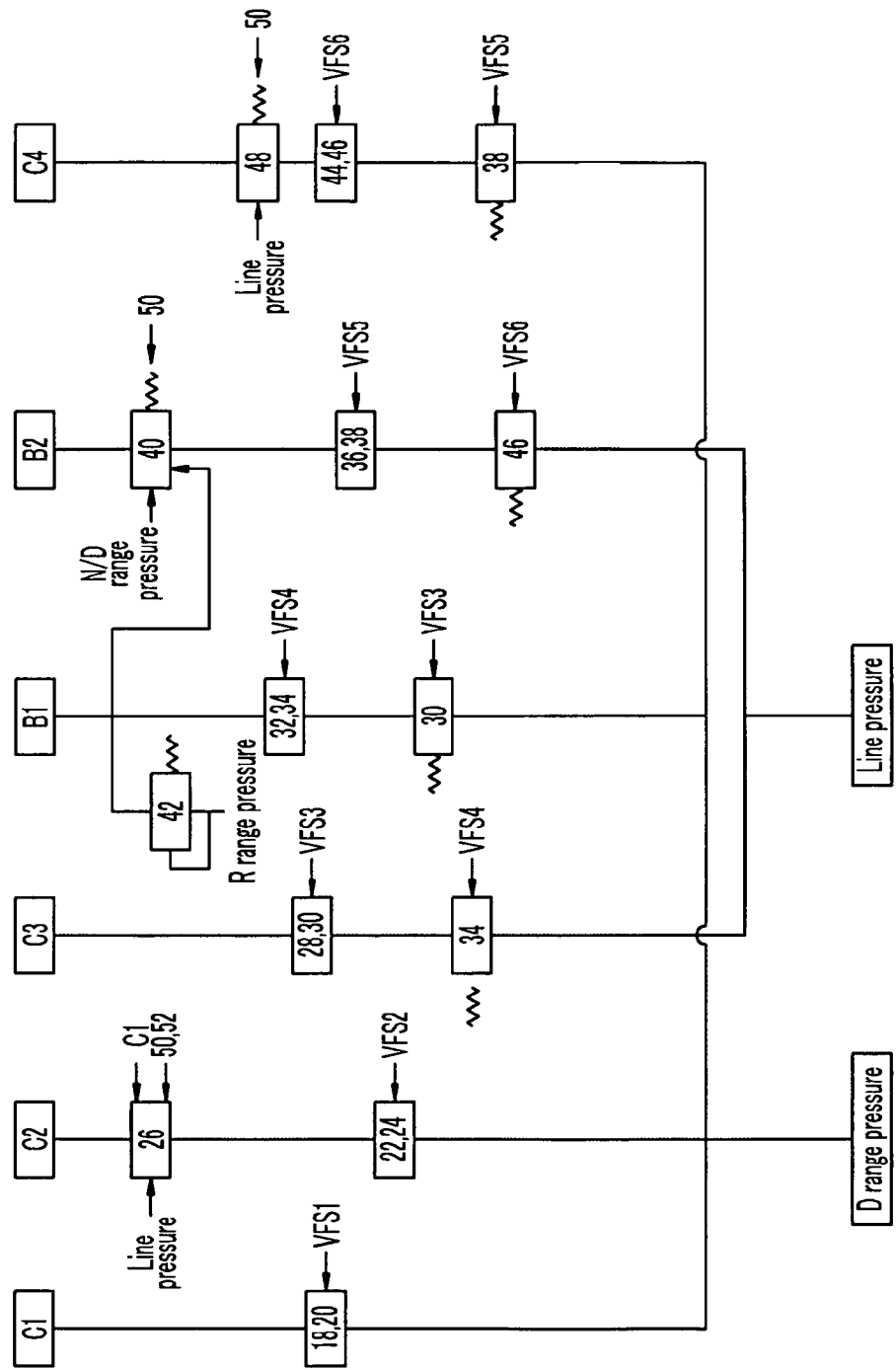
FIG. 8 is a circuit diagram of the hydraulic control system of FIG. 1.

Hydraulic pressure flows of the hydraulic control system according to an exemplary embodiment of the present invention are hereinafter described in detail with reference to FIG. 8. FIG. 8 is a circuit diagram of a hydraulic control system according to an exemplary embodiment of the present invention.

Regarding the hydraulic line for the first clutch C1, when the D range pressure is controlled by the first pressure control valve 18 and the first pressure switching valve 20 by the control of the first proportional control solenoid valve VFS1, the first clutch C1 directly receives the controlled D range pressure.

Regarding the hydraulic line for the second clutch C2, when the D range pressure is supplied to the first fail-sale valve 26 by controlling the second pressure control valve 22 and the second pressure switching valve 24 by the control of the second proportional control solenoid valve VFS2, the first fail-safe valve 26 supplies the received hydraulic pressure to the second clutch C2 by performing hydraulic line conversion by control pressures received through four routes.

The control pressures of the first fail-safe valve 26 are the line pressure, the operating pressure of the first clutch C1, the operating pressure of the third clutch C3 or the first brake B1, and the operating pressure of the second brake R2 or the fourth clutch C4.

Regarding the hydraulic line for the third clutch C3, when the line pressure is supplied to the third pressure control valve 28 by controlling the fourth pressure switching valve 34 by the control of the fourth proportional control solenoid valve VFS4, the line pressure is supplied to the third clutch C3 by controlling the third pressure control valve 28 and the third pressure switching valve 30 by the control of the third proportional control solenoid valve VFS3.

Regarding the hydraulic line for the first brake B1, when the D range pressure is supplied to the fourth pressure control valve 32 by controlling the third pressure switching valve 30 by the control of the third proportional control solenoid valve VFS3, the D range pressure is supplied to the first brake B1 by controlling the fourth pressure control valve 32 and the fourth pressure switching valve 34 by the control of the fourth proportional control solenoid valve VFS4.

Regarding the hydraulic line for the second brake B2, when at the eighth forward speed and the L range, the line pressure is supplied to the fifth pressure control valve 36 by controlling the sixth pressure switching valve 46 by the control of the sixth proportional control solenoid valve VFS6, the line pressure is supplied to the second fail-safe valve 40 by controlling the fifth pressure control valve 36 and the fifth pressure switching valve 38 by the control of the fifth proportional control solenoid valve VFS5. Then, the second fail-safe valve 40 supplies the received hydraulic pressure to the second brake B2 by performing hydraulic line conversion by control pressures through three routes.

At the reverse speed, the R range pressure supplied from the switching valve 42 is supplied to the second brake B2 through the second fail-safe valve 40.

the control pressures of the second fail-safe valve 40 are the N/D range pressure and the operating pressure of the third clutch C3 or the first brake B1.

Regarding the hydraulic line for the fourth clutch C4, when the D range pressure is supplied to the sixth pressure control valve 44 by controlling the fifth pressure switching valve 38 by the control of the fifth proportional control solenoid valve VFS5, the D range pressure is supplied to the third fail-safe valve 48 by controlling the sixth pressure control valve 44 and the sixth pressure switching valve 46 by the control of the sixth proportional control solenoid valve VFS6. Then, the third fail-safe valve 48 supplies the received hydraulic pressure to the fourth clutch C4 by performing hydraulic line conversion by control pressures through two routes.

The control pressures of the third fail-safe valve 48 are the line pressure and the operating pressure of the third clutch C3 or the first brake B1.

According to such a hydraulic pressure control system, respective friction members operate at respective speeds. The first clutch C1 and a one-way clutch (not shown) operate at the first forward speed. The first clutch C1 and the first brake B1 operate at the second forward speed. The first clutch C1 and the third clutch C3 operate at the third forward speed. The first clutch C1 and the second clutch C2 operate at the fourth forward speed. The second clutch C2 and the third clutch C3 operate at the fifth forward speed. The second clutch C2 and the fourth clutch C4 operate at the sixth forward speed. The second clutch C2 and the first brake B1 operate at the seventh forward speed. The second clutch C2 and the second brake B2 operate at the eighth forward speed. The third clutch C3 and the second brake B2 operate at the reverse speed.

Flows of hydraulic pressure in the hydraulic control system at each forward speeds and the reverse speed will be apparent to a person of ordinary skill in the field of hydraulic control systems of automatic transmissions in view of the above description with reference to FIG. 1 to FIG. 7.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hydraulic control system of an eight-speed automatic transmission for a vehicle for controlling a first clutch at first, second, third, and forth forward speeds and an L range, a second clutch operated at fourth, fifth, sixth, seventh, and eighth forward speeds, a third clutch operated at the third and fifth forward speeds and a reverse speed, a fourth clutch operated at the sixth forward speed, a first brake operated at the second and seventh forward speeds, and a second brake operated at the eighth forward speed and the L range, the hydraulic control system comprising:
    a first clutch control portion that provides a first supply of a D range pressure to the first clutch, the first supply of the D range pressure being controlled by a first pressure control valve and a first pressure switching valve by a control of a first proportional control valve;
    a second clutch control portion that provides a second supply of the D range pressure to the second clutch via a first fail-safe valve, the second supply of the D range pressure being controlled by a second pressure control valve and a second pressure switching valve by a control of a second proportional control valve;
    a third clutch control portion that provides a first supply of a line pressure to the third clutch, the first supply of the line pressure being controlled by a third pressure control valve and a third pressure switching valve by a control of a third proportional control valve, a second supply of the line pressure to the third pressure control valve being controlled by a fourth pressure switching valve by a control of a fourth proportional control valve;
    a first brake control portion that provides a third supply of the D range pressure to the first brake, the third supply of the D range pressure being controlled by the fourth pressure control valve and the fourth pressure switching valve by a control of the fourth proportional control valve, a fourth supply of the D range pressure to the fourth pressure control valve being controlled by the third pressure switching valve by a control of the third proportional control valve;
    a second brake control portion that provides a third supply of the line pressure or a supply of an R range pressure to the second brake via a second fail-safe valve, the third supply of the line pressure being controlled by a fifth pressure control valve and a fifth pressure switching valve by a fifth proportional control valve, a fourth supply of the line pressure to the fifth pressure control valve being controlled by a sixth pressure switching valve by a control of a sixth proportional control valve, and the R range pressure being supplied from a manual valve to the second fail-safe valve through a switching valve; and
    a fourth clutch control portion that provides a fifth supply of the D range pressure to the fourth clutch via a third fail-safe valve, the fifth supply of the D range pressure being controlled by a sixth pressure control valve and the sixth pressure switching valve by a control of the sixth proportional control valve, and a sixth supply of the D range pressure to the sixth pressure control valve being controlled by the fifth pressure switching valve by a control of the fifth proportional control valve.

2. The hydraulic control system of claim 1, wherein:
    each of the first, second, third, fourth, fifth, and sixth proportional control valves independently supplies a reduced pressure of a first reducing valve to the first, second, third, fourth, fifth, and sixth pressure control valves and the first, second, third, fourth, fifth, and sixth pressure switching valves as control pressures; and
    the first, second, third, fourth, fifth, and sixth pressure switching valves commonly receive a control pressure from a second reducing valve.

3. The hydraulic control system of claim 1, wherein the line pressure, an operating pressure of the first clutch, an operating pressure of the third clutch or the first brake, and an operating pressure of the second brake or the fourth clutch are supplied as control pressures to the first fail-safe valve through four routes.

4. The hydraulic control system of claim 1, wherein an N/D range pressure and the operating pressure of the third clutch and the first brake are supplied as control pressures to the second fail-safe valve through three routes.

5. The hydraulic control system of claim 1, wherein the line pressure and the operating pressure of the third clutch and the first brake are supplied as control pressures to the third fail-safe valve.

6. The hydraulic control system of claim 3, further comprising a first shuttle valve between the third clutch and the first brake such that a selective one of the operating pressures of the third clutch and the first brake may be supplied to the first, second, and third fail-safe valves.

7. The hydraulic control system of claim 3, further comprising a second shuttle valve between the second brake and the fourth clutch such that a selective one of the operating pressures of the second brake and the fourth clutch may be supplied to the first fail-safe valve.

8. The hydraulic control system of claim 1, wherein the switching valve of the second brake control portion is controlled by the R range pressure supplied from the manual valve, and supplies the R range pressure to the second brake via the second fail-safe valve.

9. The hydraulic control system of claim 1, wherein the first pressure control valve is integrally formed with the first proportional control valve and comprises a valve body and a valve spool,
wherein the valve body of the first pressure control valve comprises a first port that receives a control pressure from the first proportional control valve, a second port that receives the D range pressure, a third port that supplies the hydraulic pressure of the second port to the first clutch, a fourth port that exhausts the hydraulic pressure supplied to the first clutch, and a fifth port that receives the partial pressure of the operating pressure supplied to the first clutch through the first pressure switching valve.

10. The hydraulic control system of claim 1, wherein the first pressure switching valve comprises a valve body and a valve spool,
wherein the valve body of the first pressure switching valve comprises a first port that receives the reduced pressure of the second reducing valve, a second port that receives the control pressure from the first proportional control valve at an opposite side of the first port, a third port that receives the partial pressure of the operating pressure supplied to the first clutch through the first pressure control valve, a fourth port that is connected with the fifth port of the first pressure control valve, and a fifth port that selectively communicates with the fourth port.

11. The hydraulic control system of claim 1, wherein the second pressure control valve is integrally formed with the second proportional control valve and comprises a valve body and a valve spool,
wherein the valve body of the second pressure control valve comprises a first port that receives a control pressure from the second proportional control valve, a second port that receives the D range pressure, a third port that supplies the hydraulic pressure of the second port to the second pressure switching valve and the first fail-safe valve, a fourth port that exhausts the hydraulic pressure supplied to the third port, and a fifth port that receives a partial pressure of the hydraulic pressure supplied to the second pressure switching valve.

12. The hydraulic control system of claim 2, wherein the second pressure switching valve comprises a valve body and a valve spool,
wherein the valve body comprises a first port that receives the reduced pressure of the second reducing valve, a second port that receives the control pressure from the second proportional control valve at an opposite side of the first port, a third port that receives a partial pressure of the hydraulic pressure supplied to the first fail-safe valve, a fourth port that connects the third port with the fifth port of the second pressure control valve, and a fifth port that exhausts the hydraulic pressure supplied to the fourth port.

13. The hydraulic control system of claim 1, wherein the first fail-safe valve comprises a valve body and a valve spool,
wherein the valve body of the first fail-safe valve comprises a first port that receives a partial pressure of the operating pressure of the first clutch as a control pressure, a second port that selectively receives the operating pressure of the fourth clutch and the second brake, a third port that selectively receives the operating pressure of the third clutch and the first brake, a fourth port that receives the hydraulic pressure from the second pressure control valve, a fifth port that supplies the hydraulic pressure supplied through the fourth port to the second clutch, a sixth port that receives the line pressure as a control pressure, and a seventh port that exhausts the hydraulic pressure supplied to the fifth port.

14. The hydraulic control system of claim 1, wherein the third pressure control valve is integrally formed with the third proportional control valve and comprises a valve body and a valve spool,
wherein the valve body of the third pressure control valve comprises a first port that receives a control pressure from the third proportional control valve, a second port that receives the hydraulic pressure from the fourth pressure switching valve, a third port that supplies the hydraulic pressure of the second port to the third clutch, a fourth port that exhausts the hydraulic pressure supplied to the third port, and a fifth port that receives a control pressure from the third pressure switching valve.

15. The hydraulic control system of claim 2, wherein the third pressure switching valve comprises a valve body and a valve spool,
wherein the valve body of the third pressure switching valve comprises a first port that receives the reduced pressure of the second reducing valve, a second port that receives the control pressure from the third proportional control valve at an opposite side of the first port, a third port that receives the partial pressure of the hydraulic pressure supplied to the third clutch through the third pressure control valve, a fourth port that connects the third port with the fifth port of the third pressure control valve, a fifth port that selectively communicates with the fourth port so as to exhaust the hydraulic pressure of the fourth port, a sixth port that receives the D range pressure, a seventh port that selectively supplies the hydraulic pressure of the sixth port to the fourth pressure control valve, and an eighth port that selectively exhausts the hydraulic pressure of the seventh port.

16. The hydraulic control system of claim 1, wherein fourth pressure control valve is integrally formed with the fourth proportional control valve and comprises a valve body and a valve spool,
wherein the valve body of the fourth pressure control valve comprises a first port that receives a control pressure from the fourth proportional control valve, a second port that receives the hydraulic pressure from the third pressure switching valve, a third port that supplies the hydraulic pressure of the second port to the first brake, a fourth port that exhausts the hydraulic pressure supplied to the third port, and a fifth port that receives a control pressure from the fourth pressure switching valve.

17. The hydraulic control system of claim 1, wherein the fourth pressure switching valve comprises a valve body and a valve spool,
wherein the valve body of the fourth pressure switching valve comprises a first port that receives the reduced pressure of the second reducing valve, a second port that receives the control pressure from the fourth proportional control valve at an opposite side of the first port, a third port that receives the partial pressure of the hydraulic pressure supplied to the first brake through the fourth pressure control valve, a fourth port that connects the third port with the fifth port of the fourth pressure control valve, a fifth port that receives the line pressure, a sixth port that supplies the hydraulic pressure received through the fifth port to the third pressure control valve, a seventh port that selectively exhausts the hydraulic pressure of the fourth port, and an eighth port that selectively exhausts the hydraulic pressure of the sixth port.

18. The hydraulic control system of claim 1, wherein the fifth pressure control valve is integrally formed with the fifth proportional control valve and comprises a valve body and a valve spool, wherein the valve body of the fifth pressure control valve comprises a first port that receives a control pressure from the fifth proportional control valve, a second port that receives the line pressure from the sixth pressure switching valve, a third port that supplies the hydraulic pressure of the second port to the second fail-safe valve, a fourth port that exhausts the hydraulic pressure supplied to the third port, and a fifth port that receives a partial pressure of the operating pressure supplied to the fifth pressure switching valve.

19. The hydraulic control system of claim 1, wherein the fifth pressure switching valve comprises a valve body and a valve spool, wherein the valve body of the fifth pressure switching valve comprises a first port that receives the reduced pressure of the second reducing valve, a second port that receives the control pressure from the fifth proportional control valve at an opposite side of the first port, a third port that receives the partial pressure of the hydraulic pressure supplied to the second fail-safe valve through the fifth pressure control valve, a fourth port that selectively communicates with the third port and is connected with the fifth port of the fifth pressure control valve, a fifth port that receives the D range pressure, a sixth port that supplies the D range pressure supplied to the fifth port to the sixth pressure control valve, and seventh and eighth ports that are exhaust ports.

20. The hydraulic control system of claim 1, wherein the second fail-safe valve comprises a valve body and a valve spool, wherein the valve body of the first pressure switching valve comprises first and second ports that are formed at ends of the valve body and receive the N/D range pressure as control pressures, a third port that receives the hydraulic pressure from the fifth pressure control valve, a fourth port that receives the reverse range pressure from the switching valve, a fifth port that selectively supplies the hydraulic pressure of the third and fourth ports to the second brake, and a sixth port that receives the operating pressure of the third clutch or the first brake as a control pressure.

21. The hydraulic control system of claim 1, wherein the switching valve comprises a valve body and a valve spool, wherein the valve body of the switching valve comprises first and second ports that receive the R range pressure as control pressures, a third port that receives the hydraulic pressure from the fourth pressure control valve, and a fourth port that supplies the hydraulic pressure of the third port to the second fail-safe valve.

22. The hydraulic control system of claim 1, wherein the sixth pressure control valve is integrally formed with the sixth proportional control valve and comprises a valve body and a valve spool, wherein the valve body of the sixth pressure control valve comprises a first port that receives a control pressure from the sixth proportional control valve, a second port that receives the D range pressure from the third pressure switching valve, a third port that supplies the hydraulic pressure of the second port to the third fail-safe valve, a fourth port that exhausts the hydraulic pressure supplied to the third port, and a fifth port that receives a control pressure from the sixth pressure switching valve.

23. The hydraulic control system of claim 2, wherein the sixth pressure switching valve comprises a valve body and a valve spool, wherein the valve body of the sixth pressure switching valve comprises a first port that receives the reduced pressure of the second reducing valve, a second port that receives the control pressure from the sixth proportional control valve at an opposite side of the first port, a third port that receives the partial pressure of the hydraulic pressure supplied to the third fail-safe valve through the sixth pressure control valve, a fourth port that connects the third port with the fifth port of the sixth pressure control valve, a fifth port that receives the line pressure, a sixth port that supplies the hydraulic pressure supplied through the fifth port to the fifth pressure control valve, a seventh port that selectively exhausts the hydraulic pressure of the fourth port, and an eighth port that selectively exhausts the hydraulic pressure of the sixth port.

24. The hydraulic control system of claim 1, wherein the third fail-safe valve comprises a valve body and a valve spool, wherein the valve body of the third fail-safe valve comprises first and second ports at ends of the valve body that receive the line pressure as a control pressure, a third port that receives the D range pressure from the sixth pressure control valve, a fourth port that supplies the hydraulic pressure supplied through the third port to the fourth clutch, a fifth port that receives the operating pressure of the third clutch or the first brake, and a sixth port that exhausts the hydraulic pressure of the fourth port.

* * * * *